(12) United States Patent
Schneider

(10) Patent No.: US 10,027,652 B2
(45) Date of Patent: Jul. 17, 2018

(54) SECURED AGENT COMMUNICATIONS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1185 days.

(21) Appl. No.: 11/998,093

(22) Filed: Nov. 27, 2007

(65) Prior Publication Data

US 2009/0138602 A1    May 28, 2009

(51) Int. Cl.
*H04L 29/06* (2006.01)
*G06F 21/31* (2013.01)

(52) U.S. Cl.
CPC .......... *H04L 63/0823* (2013.01); *G06F 21/31* (2013.01); *H04L 63/168* (2013.01)

(58) Field of Classification Search
CPC .................................................. H04L 63/0823
See application file for complete search history.

(56) References Cited

U.S. PATENT DOCUMENTS

| | | | | |
|---|---|---|---|---|
| 2003/0191935 A1* | 10/2003 | Ferguson | ............... | H04W 12/02 713/153 |
| 2003/0233540 A1* | 12/2003 | Banerjee et al. | ............. | 713/153 |
| 2004/0258040 A1* | 12/2004 | Joshi et al. | .................... | 370/349 |
| 2005/0076126 A1* | 4/2005 | Knight et al. | ................ | 709/227 |
| 2006/0064736 A1* | 3/2006 | Ahuja et al. | ....................... | 726/1 |
| 2006/0095772 A1* | 5/2006 | Bell et al. | ....................... | 713/171 |
| 2006/0143301 A1* | 6/2006 | Merkh et al. | ................. | 709/227 |
| 2007/0220141 A1* | 9/2007 | Primm et al. | ................. | 709/224 |
| 2008/0082677 A1* | 4/2008 | Miyazawa et al. | ........... | 709/229 |
| 2008/0127322 A1* | 5/2008 | McCall et al. | .................. | 726/11 |

* cited by examiner

*Primary Examiner* — Suraj Joshi
(74) *Attorney, Agent, or Firm* — Lowenstein Sandler LLP

(57) ABSTRACT

A server communicates with a network appliance. The server includes an agent. The network appliance sends a request to the agent. The request includes an identification of a port. The agent negotiates a secured communication channel with the network appliance on the identified port to retrieve further instructions from the network appliance. The instructions includes one or more commands. The server reports the results of the executed command to the network appliance on the initial channel.

14 Claims, 5 Drawing Sheets

SECURED AGENT COMMUNICATIONS

TECHNICAL FIELD

Embodiments of the present invention relate to a server, and more particularly, to an agent of a server.

BACKGROUND

A server running Windows operating system can include an agent that interfaces between the Windows operating system and another device such as a network appliance. However, secured communications between the agent and the network appliance may be restricted. As such the agent may not be able to execute commands from the network appliance.

A need therefore exists for a method to authenticate and secure communications between a server agent and a network appliance in order to allow arbitrary commands to be run on the server.

DESCRIPTION OF THE DRAWINGS

The present invention is illustrated by way of example, and not by way of limitation, in the figures of the accompanying drawings and in which.

DETAILED DESCRIPTION

Described herein is a system comprising a server and a network appliance. The server includes an agent. The network appliance sends a request to the agent. The request includes an identification of a port. The agent negotiates a secured communication channel with the network appliance on the identified port to retrieve instructions from the network appliance. The instructions includes a command. The server executes the command and sends the results of the executed command to the network appliance on the initial HTTP channel.

Figure 1:
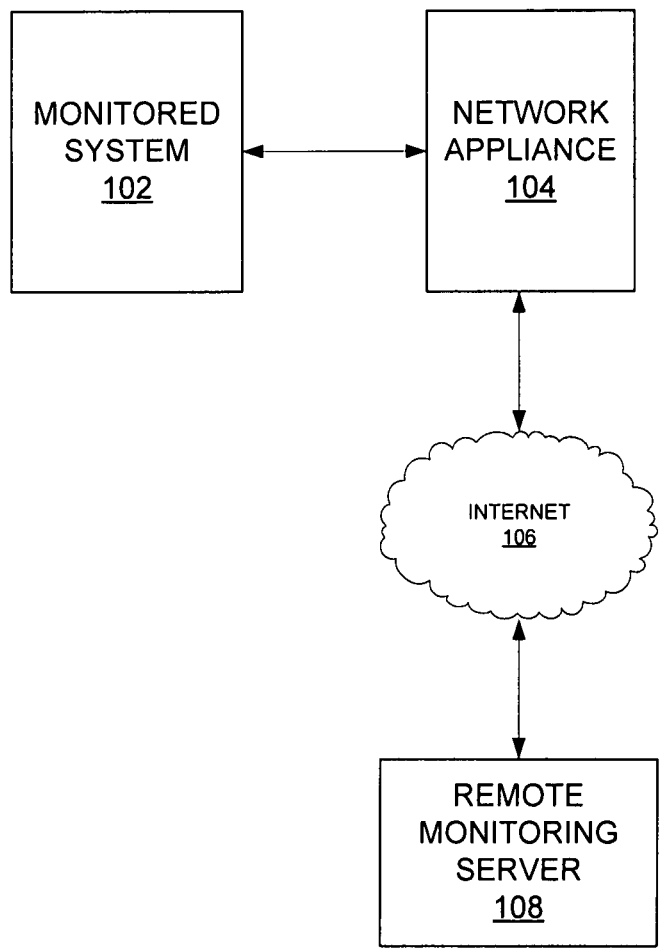
FIG. 1 is a block diagram illustrating an example of a system for monitoring a server.

FIG. 1 is a block diagram illustrating one embodiment of an example of a computing system. A monitored system 102, such as a Windows server, may be monitored by a network appliance such as a scout 104. The monitored information is sent out to a remote monitoring server 108, also referred to as Command Center, via a network 106, such as Internet or another other type of network. In this example, server 102 to be monitored may include a Windows Server such as Windows 2003.

Scout 104 may be a network appliance designed to provide monitoring services. It may act as a conduit to collect monitoring data or information on Windows server 110. Scout 104 collects monitoring data from Windows server 102 on a periodic basis. Scout 104 can run a variety of probes against Windows server 102, using common application protocols such as SNMP or HTTP to gather monitoring data. Scout 104 then packages this data and sends it to the remote monitoring server 108 over a secure connection at regular intervals. Scout 104 can also requests any updates to the configurations, probe definitions, etc. during this dial-home connection session.

In one embodiment, scout 104 may be a device including an operating system, a remote monitoring scout client, and scout provisioning and troubleshooting tools. Scout 104 may need to have an agent of the Windows server 102 run or execute arbitrary commands. As such a secured communication may be needed between the Windows server 102 and scout 102. In one embodiment, a dual-channel communication between the agent and the scout may be used to secure the communication.

Figure 2:
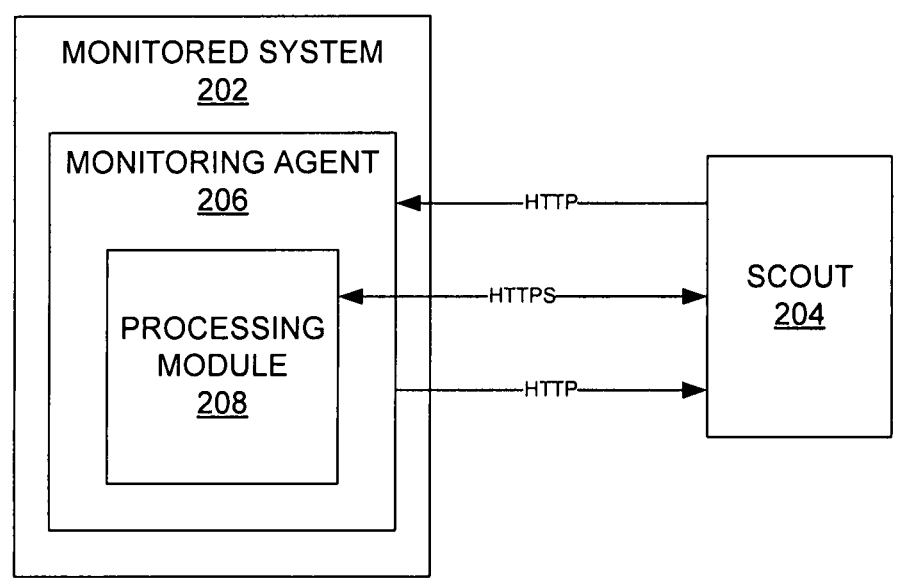
FIG. 2 is a block diagram illustrating one embodiment of a server system.

FIG. 2 is a block diagram illustrating one embodiment of a monitored system 202, such as a Windows server. In one embodiment, the Windows server 202 includes a monitoring agent 206 which communicates with an external device such as a scout 204. The monitoring agent 206 may include a software running on the server 202 as a service process or a user level process. For example, the agent 206 may be a Windows agent running on a Windows server.

Scout 204 sends an HTTP request to the agent 206 to connect back to scout 204 using HTTPS on a particular port for further instructions. Scout 204 starts an HTTPS server on the particular port for agent 206 to connect. In other words, scout 204 waits for a secured communication request from agent 206.

Agent 206 may act as an HTTP server waiting for a request from scout 204. Scout 204 may act as an HTTP client when it is sending the above request to agent 206.

Agent 206 may include a processing module 208 to perform the HTTPS request to scout 204 on the particular port. Thus, agent 206 may act as an HTTPS client sending the secured communication request on the particular port.

Agent 206 can authenticate scout 204 using the SSL certificate of scout 204. When Agent 206 successfully negotiates a secured communication channel with scout 204 on the particular port of the HTTPS server, agent 206 retrieve instructions from scout 204. The instructions may include arbitrary commands to be run by agent 206. Windows agent 206 executes the commands on Windows server 202 and sends the results of the executed commands to scout 204 on the original HTTP channel.

Figure 3:
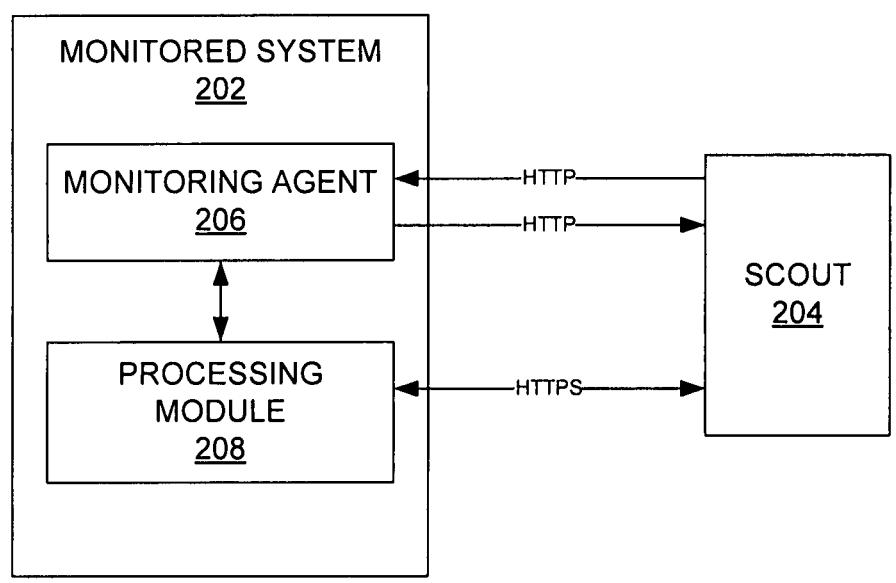
FIG. 3 is a block diagram illustrating another embodiment of a server system.

FIG. 3 is a block diagram illustrating another embodiment of Windows server 202. In another embodiment, processing module 208 may be a separate program from Windows agent 206. In one embodiment, processing module 208 includes an OpenSSL command line utility.

Figure 4:
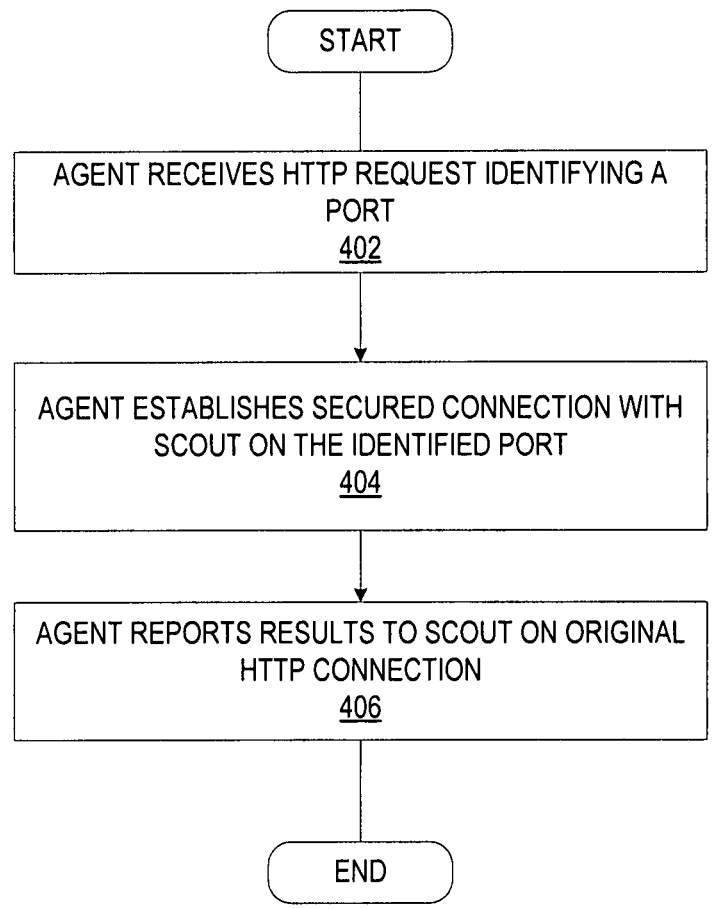
FIG. 4 is a flow diagram illustrating of one embodiment of a method for authenticating a communication with a server.

FIG. 4 is a flow diagram illustrating of one embodiment of a method for monitoring a device. At 402, an agent of a server receives an HTTP request from a scout, local to the server. In one embodiment, agent acts as a HTTP server waiting for a request from the scout. The scout acts as a HTTP client sending the request. The HTTP request may identify a port.

At 404, the agent establishes a secured communication channel with the scout at is acting as a HTTPS server. agent acts as a HTTPS client and negotiates the secured communication channel using the identified port to retrieve instructions from the scout. The instructions can include arbitrary commands to be run by the agent. At 406, agent reports the results of the executed commands on the server to the scout on the original HTTP connection.

In one embodiment, agent authenticates the scout with a SSL certificate of the scout. A secured communication engine performs the HTTPS request from the Windows agent to the scout. The secured communication engine could be part of the agent. In another embodiment, the secured communication engine could be an entirely separate program from agent.

Figure 5:
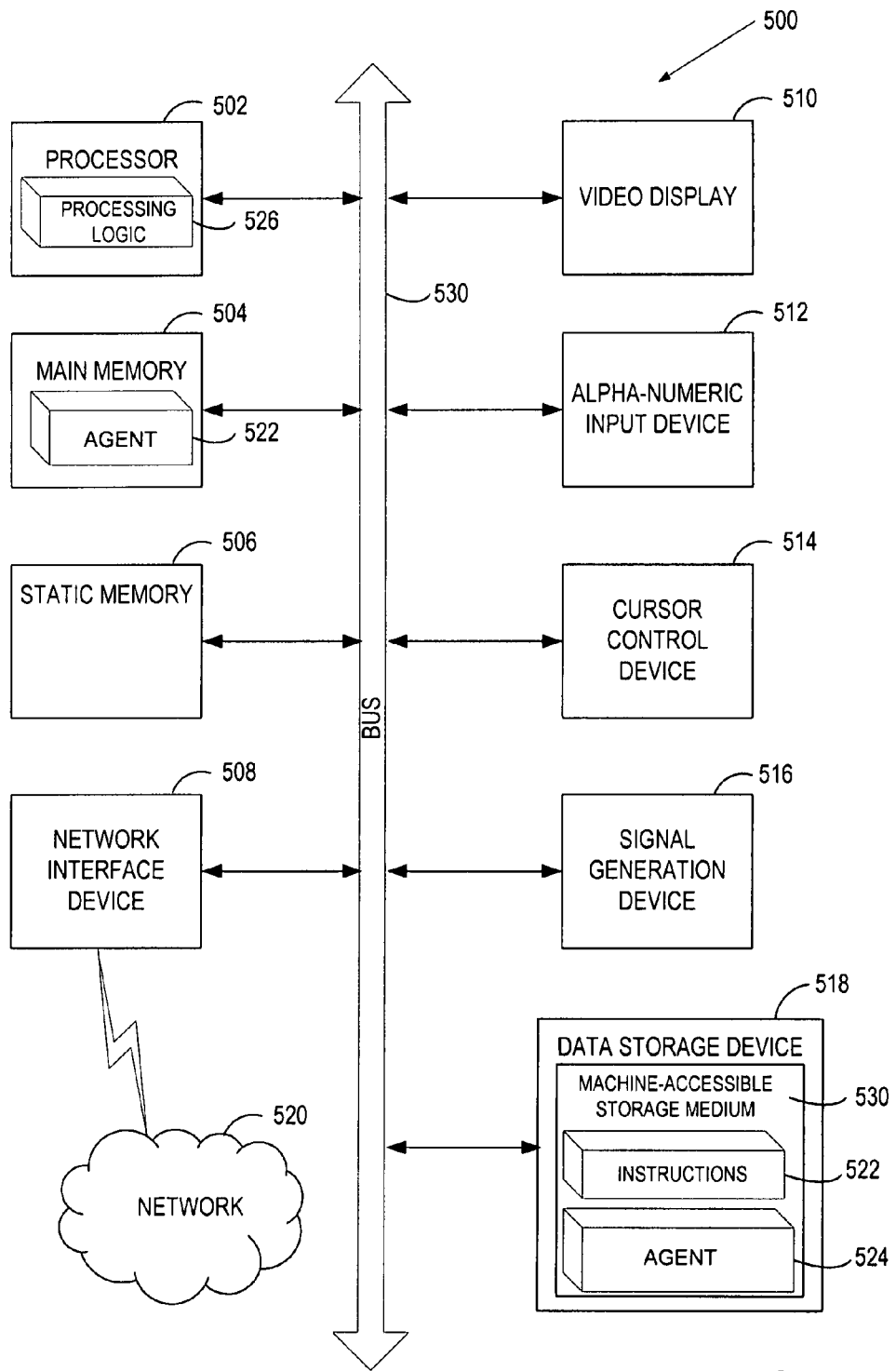
FIG. 5 is a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store an agent 524 as described above. The agent 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    sending, by a processing device of a network appliance, a first request to a monitored system via an unsecured communication channel associated with a first communication port of the network appliance, wherein the first request requests the monitored system to connect with the network appliance using a secure communication channel on a second communication port of the network appliance, wherein the first request comprising an identification of the second communication port of the network appliance, wherein the second communication port is different from the first communication port, wherein the first request requests the monitored system to connect with the network appliance using HyperText Transfer Protocol-Secure (HTTPS) on the second communication port;
    responsive to sending the first request, starting, by the network appliance, a secure communication server on the second communication port of the network appliance;
    receiving, by the secure communication server, a second request from the monitored system;
    establishing, responsive to receiving the second request, the secure communication channel with the monitored system via the second communication port;
    transmitting, by the processing device, using the secure communication channel, a command to the monitored system;
    receiving, by the processing device, via the unsecured communication channel, results of executing the command by the monitored system;
    collecting, at determined intervals, additional results from the monitored system; and
    transmitting the additional results to a remote monitoring server.

2. The method of claim 1, further comprising:
    transmitting, to the monitored system, a certificate of the network appliance.

3. The method of claim 1, wherein the unsecured communication channel is provided by a HyperText Transfer Protocol (HTTP) connection.

4. The method of claim 1, wherein the secure communication channel is provided by an HTTPS connection.

5. The method of claim 1, further comprising:
    transmitting, to the remote monitoring server, the results of executing the command by the monitored system.

6. A non-transitory computer-readable storage medium, having instructions stored therein, which when executed by a processing device of a network appliance, cause the processing device to:
    send, by the processing device, a first request to a monitored system via an unsecured communication channel associated with a first communication port of the network appliance, wherein the first request requests the monitored system to connect with the network appliance using a secure communication channel on a second communication port of the network appliance, wherein the first request comprising an identification of the second communication port of the network appliance, wherein the second communication port is different form the first communication port, wherein the first request requests the monitored system to connect with the network appliance using HyperText Transfer Protocol-Secure (HTTPS) on the second communication port;
    responsive to sending the first request, start, by the network appliance, a secure communication server on the second communication port of the network appliance;
    receive, by the secure communication server, a second request from the monitored system;
    establish, responsive to receiving the second request, the secure communication channel with the monitored system via the second communication port;
    transmit, by the processing device, using the secure communication channel, a command to the monitored system;
    receive, by the processing device, via the unsecured communication channel, results of executing the command by the monitored system;
    collect, at determined intervals, additional results from the monitored system; and
    transmit the additional results to a remote monitoring server.

7. The non-transitory computer-readable storage medium of claim 6, further comprising executable instructions to cause the processing device to:
    transmit, to the monitored system, a certificate of the network appliance.

8. The non-transitory computer-readable storage medium of claim 6, wherein the unsecured communication channel is provided by an HTTP connection.

9. The non-transitory computer-readable storage medium of claim 6, wherein the secure communication channel is provided by an HTTPS connection.

10. The non-transitory computer-readable storage medium of claim 6, further comprising executable instructions to cause the processing device to:
    transmit, to the remote monitoring server, the results of executing the command by the monitored system.

11. A network appliance, comprising:
    a memory;
    a processing device, operatively coupled to the memory, the processing device to:
        send a first request to a monitored system via an unsecured communication channel associated with a first communication port of the network appliance, wherein the first request requests the monitored system to connect with the network appliance using a secure communication channel on a second communication port of the network appliance, wherein the first request comprising an identification of the second communication port of the network appliance, wherein the second communication port is different from the first communication port, wherein the first request requests the monitored system to connect with the network appliance using HyperText Transfer Protocol-Secure (HTTPS) on the second communication port;

responsive to sending the first request, start, by the network appliance, a secure communication server on the second communication port of the network appliance;

receive, by the secure communication server, a second request from the monitored system;

establish, responsive to receiving the second request, the secure communication channel with the monitored system via the second communication port;

transmit using the secure communication channel, a command to the monitored system;

receive, via the unsecured communication channel, results of executing the command by the monitored system;

collect, at determined intervals, additional results from the monitored system; and transmit the additional results to a remote monitoring server.

12. The network appliance of claim 11, wherein the processing device is further to transmit, to the monitored system, a certificate of the network appliance.

13. The network appliance of claim 11, wherein the unsecured communication channel is provided by a HyperText Transfer Protocol (HTTP) connection.

14. The network appliance of claim 11, wherein the processing device is further to:

transmit, to the remote monitoring server, the results of executing the command by the monitored system.

\* \* \* \* \*